A. W. Lake
Fermenting App's
N° 86,234.
Patented Jun. 26, 1869.

Witnesses:
Wm H Preston Jr.
W. B. Denning

Inventor:
Aaron W Lake
by Knight Bros
Att'ys.

AARON W. LAKE, OF ADAMS, NEW YORK.

Letters Patent No. 86,234, dated January 26, 1869.

IMPROVED APPARATUS FOR FERMENTING ALE, BEER, &c.

The Schedule referred to in these Letters Patent and making part of the same.

*To all whom it may concern:*

Be it known that I, AARON W. LAKE, of Adams, in the county of Jefferson, and State of New York, have invented a new and useful Improvement in Fermenting Ale or Beer; and I do hereby declare the following to be a full, clear, and exact description of the same, reference being had to the accompanying drawings, which form part of this specification.

My invention consists in a number of improvements on the patent of Clifford, Lake, and Sanders, dated April 23, 1867, for "brewing ale," and is used for fermenting ale or beer.

In the drawings—

Figure 1:
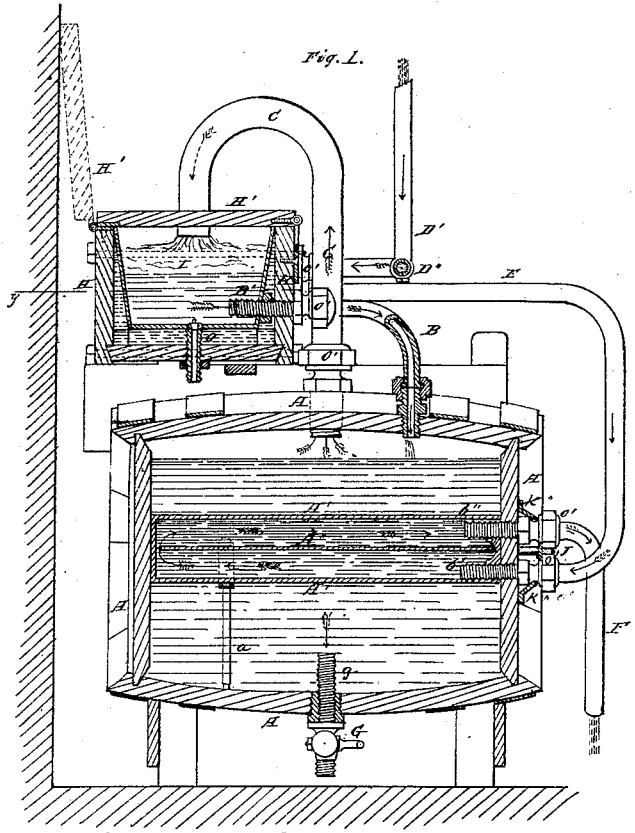
Figure 1 represents a vertical section of my improvement upon the line x–x, fig. 2.

A represents the casks or tanks, which contain the ale or beer to be fermented, made sufficiently large to admit the body of a man, in a stooping or upright posture.

A' is a cylinder, extending through the cask or tank A, from end to end, into which water is introduced, by means of the pipe E, to cool the ale or beer, and prevent too rapid fermentation of the same.

A" is a partition, running horizontally through the cylinder A', from the front end to near the rear, leaving just room for the water, as it enters through the pipe E, to pass between the end of the partition and the cylinder, finding its way out above the place of entrance through the pipe F.

The inner ends, b' b", of the coupling o', which connect the pipes E and F to the head of the cask, also, by passing through the head of the cylinder A', hold it in position, as shown in the drawings.

a is a standard or support, placed within the cask or tank, underneath the cylinder A', to support its weight.

G g is a pipe, screwed or fastened into the bottom of the cask or tank, through which the beer or ale is drawn off into casks or barrels.

It will be noticed here, that by having the pipe G constructed and arranged as represented in the drawings, with the end g projecting upward above the inner surface of the cask or tank, two desirable objects are gained: first, the ale or beer is easily all drawn off; second, the sediment, settling to the bottom, rests in the swell of the cask or tank, while the end, g, of the pipe G projects upward into the perfectly-clear liquor, which may thus be drawn off separately, instead of as, by the old process, being more or less mixed with sediment.

Figure 2:
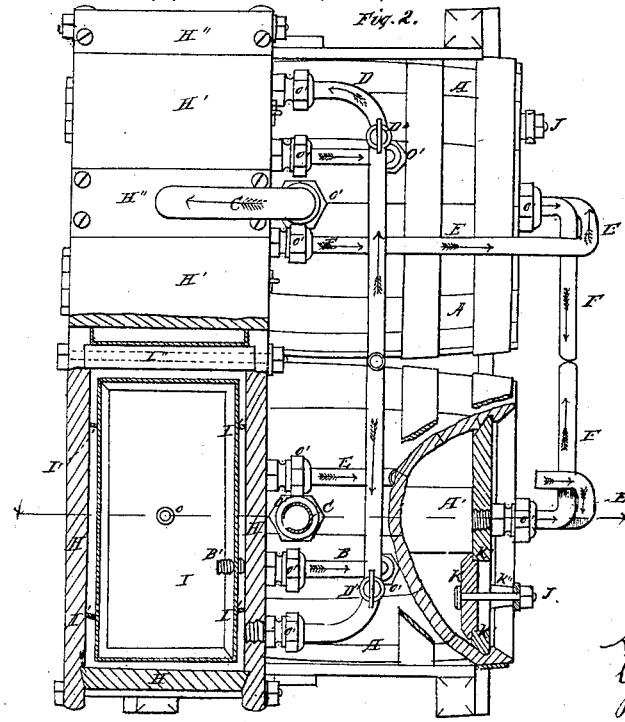
Figure 2 is a plan view, partly in section, on the line y–y, fig. 1.

When the pure liquor has thus been drawn off, the pipe g may be lowered by means of the screw-end G, and the next quality of liquor racked or drawn off, and by taking the pipe g completely out, all the sediment may be easily drawn off or removed K, fig. 2, represents a portion of the head of the cask or tank, removable, being held in position by means of the flanges k', the stay k", and the stay-bolt J.

This portion of the head, when removed, discloses an opening, sufficiently large to admit the body of a man, thus enabling any one to enter and clean the inside thoroughly, without having to move the cask or tank from its location.

H is a water-box, arranged upon the top of the casks or tanks A, at the rear end, to economize space, the pipes D, E, F, B, and C, entering at the front, instead of the rear of said cask, as in the former patent referred to, to aid in accomplishing the same saving of room.

Inside the water-box H is located the copper reservoir or trough I, in which is secured the wort before fermentation, as it comes from the boilers. This reservoir is somewhat smaller than the water-box, and so constructed and arranged as to leave a space of several inches all around between it and the box, the widest space being towards and at the bottom, to permit the circulation of cold water as it enters through the pipe D, which is supplied with one or more stop-cocks D".

This reservoir I is supplied at the bottom with a pipe, O, running downward through the water-box H, and out between the casks or tanks, for the purpose of drawing off the yeast, scum, &c., when the beer or ale has all passed into the tanks or casks, through the pipe B.

The top of the pipe O is supplied with a valve, or other movable appliance, to prevent the beer and yeast from running out prematurely.

The reservoir I and water-box H are kept separated by flanges or standards I', as shown in fig. 2.

The cool water entering the box H, circulates around the trough I, to the opposite end from the place of entrance, where it is carried off through the pipe E, into the cylinder A', within the casks or tanks A.

The water-box H is supplied with covers H', working upon hinges, or in other convenient manner. Their duty is to keep out dirt and dust, and the wort from being exposed to the atmosphere while fermenting.

B is the pipe, through which the wort passes from the trough I into the casks or tanks A.

C is a pipe, through which the yeast and scum accumulating upon the surface of the wort in the casks, during the process of fermentation, find their way back into the trough I, when the ale or beer sinks to the bottom, and is returned again to the casks A, through the pipes B.

The pipes B C D D' E F, and all others used in connection with and in my invention, are supplied with metallic couplings o', constructed in such a manner as to permit of being easily disengaged when desirable, and at the same time capable of being made air and water-tight, by suitable packing. They are also supplied with a proper number of suitable stop-cocks, to regulate the entry and discharge of water or liquor.

The water-boxes H' and trough I are divided by partitions I", so as to give to each tank a corresponding reservoir, I, and water-box B, enabling one section or one tank to be used separately, when desired.

H" are stationary covers to the water-boxes, which it is not necessary to move, the lids or covers H' being sufficiently large for all ordinary purposes.

Any number of casks, A, and corresponding water-boxes H, and troughs I, may be used, by arranging the casks side by side, as represented, extending the pipe D, and fitting up each cask, and water-box, and trough, as described hereinbefore.

It is not necessary to arrange the casks side by side, nor is it necessary that the water-boxes and troughs should be put on top of the former, but by following this arrangement, the pipes all entering at the front end, much space will be saved, as the whole apparatus may then stand close against the wall, or be built even into it, there being no necessity of removal of any of the heavier portions.

The manner in which my invention operates is as follows:

The reservoir I being filled with wort from the boilers, is surrounded by water, by means of the pipes D' D, the flow being regulated by the stop-cocks D". This somewhat cools the wort, and it runs down into the casks or tanks A, through the pipes B, when it is again subjected to the cooling influences of the water in the cylinder A', introduced and educted as set forth. The cask being full, the fermentation commences, and all the yeast, scum, &c., are forced upward through the bent pipe C into the trough I, thus keeping the casks clean and dry upon the outside. All the ale or beer that may be in the yeast, as it settles to the bottom of the trough I, is taken back into the casks again by the pipe B, thus saving much waste, and keeping the casks constantly full. Fermentation having ceased, and the contents of the casks having become sufficiently settled, the prime ale or beer is drawn off, as described heretofore, and the rest in like manner.

Having thus described my invention, the following is what I claim, and desire to secure by Letters Patent:

1. The opening or man-hole K, in the head of each cask or tank, for increasing the facilities for cleaning the same, in the manner set forth.

2. I claim the lids or covers H, and the stationary covers H" to the water-box H, arranged for the purposes and uses as described.

3. I claim the curved tube C, to be used instead of the tube bent at right angles, as in the former patent hereinbefore referred to.

4. I claim the connecting of the tubes or pipes throughout, to the casks or tanks, and the box H, and trough I, and to each other by means of metallic coupling $o'$, in order that they may be made air and water-tight, by packing, and so that they may be easily disengaged when desired.

5. I claim the cold-water pipe D, with its stop-cocks D", and connecting-pipes with the water-box H.

6. I claim the stay or support $a$, for the purposes and uses set forth.

7. I claim the arrangement of the water-pipes E F, upon the front instead of the rear end of the tanks or casks, so that space may be economized, as described.

8. I claim the divisions I", in the water-box H, for the purposes described.

9. I claim the pipe G $g$, for drawing off the liquor, acting in the manner as set forth.

10. I claim the relative arrangement of the casks, reservoirs, water-boxes, and conducting-pipes, substantially as and for the purposes specified.

To the above specification of my invention, I have signed my hand, this 21st day of December, 1868.

AARON W. LAKE.

Witnesses:
H. F. OVERTON,
M. E. RICH.